United States Patent
Manda (10) Patent No.: US 9,253,369 B2
(45) Date of Patent: Feb. 2, 2016

(54) HALFTONE DOT ADDITION APPARATUS THAT REDUCES WHITE VOID AND BREAK AT EDGE PORTION OF IMAGE

(71) Applicant: Kyocera Document Solutions Inc., Osaka (JP)

(72) Inventor: Etsuko Manda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/527,780

(22) Filed: Oct. 30, 2014

(65) Prior Publication Data

US 2015/0116780 A1 Apr. 30, 2015

(30) Foreign Application Priority Data

Oct. 30, 2013 (JP) ................. 2013-226081

(51) Int. Cl.
*H04N 1/405* (2006.01)
*G06K 15/02* (2006.01)
*H04N 1/409* (2006.01)

(52) U.S. Cl.
CPC ............ *H04N 1/405* (2013.01); *G06K 15/1881* (2013.01); *H04N 1/4092* (2013.01); *H04N 2201/0094* (2013.01)

(58) Field of Classification Search
CPC ..... H04N 1/4055; H04N 1/407; H04N 1/405; H04N 1/32203; H04N 1/32256; H04N 1/40; H04N 1/52; H04N 1/4051; H04N 1/4057; H04N 1/32219
USPC ............... 358/1.9, 2.1, 3.06–3.09, 3.13, 3.26, 358/3.28, 3.2, 534
See application file for complete search history.

(56) References Cited

U.S. PATENT DOCUMENTS

| 5,293,539 A * | 3/1994 | Spence ........................ 358/527 |
| 2002/0051147 A1* | 5/2002 | Asai ............................ 358/1.9 |
| 2004/0032600 A1* | 2/2004 | Burns et al. .................. 358/1.9 |
| 2014/0160214 A1* | 6/2014 | Conesa et al. ................ 347/101 |

FOREIGN PATENT DOCUMENTS

| EP | 1392048 A2 * | 2/2004 |
| JP | 2013-009124 A | 1/2013 |

* cited by examiner

*Primary Examiner* — Thomas D Lee
*Assistant Examiner* — Stephen M Brinich
(74) *Attorney, Agent, or Firm* — James W. Judge (57) ABSTRACT

A halftone dot addition device for adding halftone dots to halftone dot images includes an empty circle information acquiring unit and a halftone dot addition unit. The empty circle information acquiring unit obtains, in a Voronoi diagram having a generatrix corresponding to a halftone dot in a halftone dot image. The radius of an empty circle is a circle centering on a Voronoi vertex. The empty circle passes through the generatrix but not internally includes the generatrix. The halftone dot addition unit, if the radius of a target circle being the empty circle obtained, as a target, by the empty circle information acquiring unit is larger than a specific value, adds to the halftone dot image a halftone dot corresponding to a new generatrix, by adding the new generatrix to the inside of the target circle.

6 Claims, 11 Drawing Sheets

HALFTONE DOT ADDITION APPARATUS THAT REDUCES WHITE VOID AND BREAK AT EDGE PORTION OF IMAGE

CROSS-REFERENCE TO RELATED APPLICATION

This application is based upon, and claims the benefit of priority from, corresponding Japanese Patent Application No. 2013-226081 filed in the Japan Patent Office on Oct. 30, 2013, the entire contents of which are incorporated herein by reference.

BACKGROUND

Unless otherwise indicated herein, the description in this section is not prior art to the claims in this application and is not admitted to be prior art by inclusion in this section.

There is known screening that transforms an image into a halftone dot image using a screen such as a halftone screen and a line screen. The halftone dot image is constituted of periodic arrays of halftone dots expressed in tones. For execution of appropriate screening, in the screening, according to an attribution of the image before transformation, various parameters such as a mesh pattern (screen pattern), a screen line width, and a screen angle in the screening are set.

If the screening is performed on a character of light print density and a thin line, an interval between the halftone dots become large. Accordingly, a portion where the halftone dot is not arranged is generated at a part of an edge of the thin line in the halftone dot image or the character. As a result, a white void and a break may be seen at the character and the thin line.

Therefore, there is known the following method. A character and an edge part of a line are detected. According to attributions of the character and the line, one matrix is selected among a plurality of threshold matrixes of different growth methods and outputs the image.

SUMMARY

A halftone dot addition device for adding halftone dots to halftone dot images according to an aspect of the disclosure includes an empty circle information acquiring unit and a halftone dot addition unit. The empty circle information acquiring unit obtains, in a Voronoi diagram having a generatrix corresponding to a halftone dot in a halftone dot image. The radius of an empty circle is a circle centering on a Voronoi vertex. The empty circle passes through the generatrix but not internally includes the generatrix. The halftone dot addition unit, if the radius of a target circle being the empty circle obtained, as a target, by the empty circle information acquiring unit is larger than a specific value, adds to the halftone dot image a halftone dot corresponding to a new generatrix, by adding the new generatrix to the inside of the target circle.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, an embodiment of the disclosure will be described by referring to the accompanying drawings.

First, the following describes a configuration of a Multifunction Peripheral (MFP) as a halftone dot addition apparatus according to this embodiment.

Figure 1:
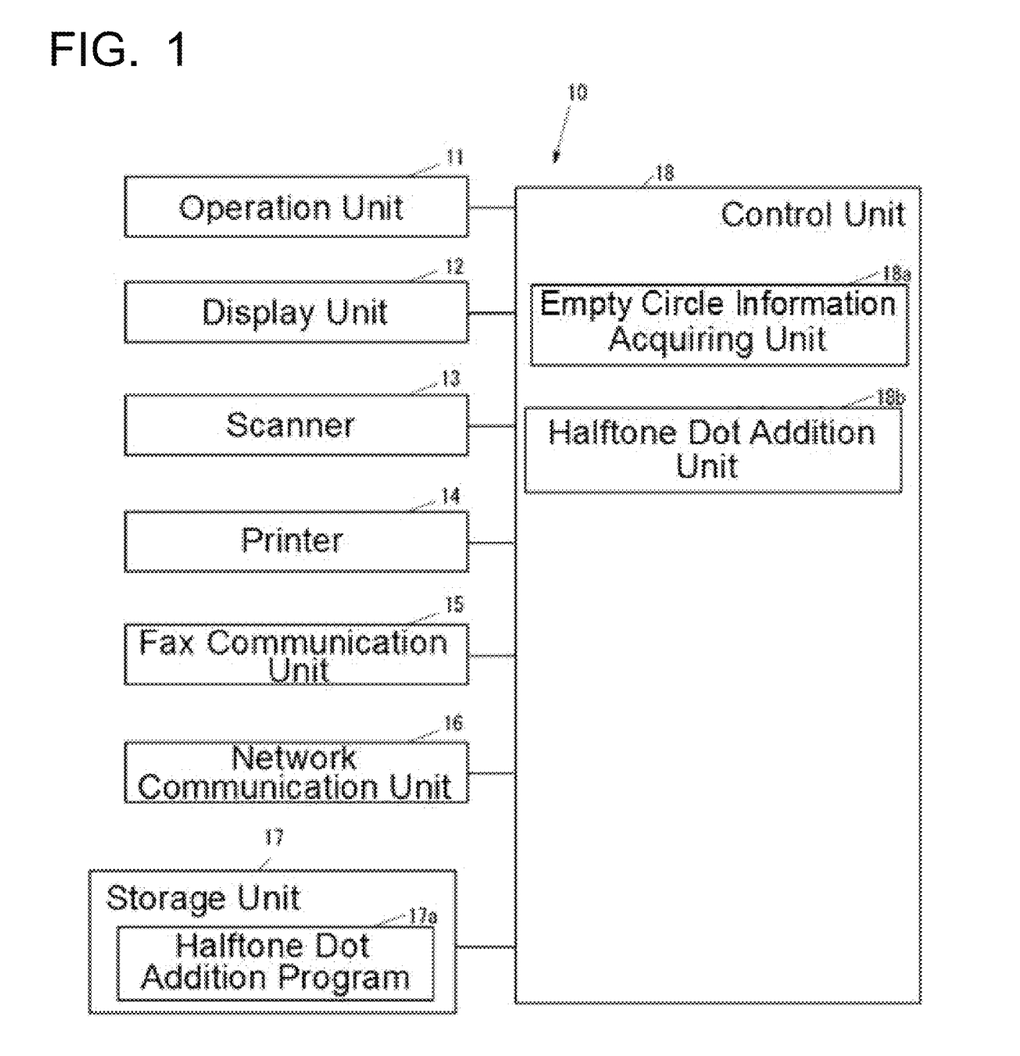
FIG. 1 illustrates a configuration of an MFP according to an embodiment of the disclosure.

FIG. 1 is a block diagram illustrating a configuration of an MFP 10 according to the embodiment.

As illustrated in FIG. 1, the MFP 10 includes an operation unit 11, a display unit 12, a scanner 13, a printer 14, a fax communication unit 15, a network communication unit 16, a storage unit 17, and a control unit 18. The operation unit 11 is an input device such as a button with which a user inputs various operations. The display unit 12 is a display device such as a Liquid Crystal Display (LCD) that displays various information. The scanner 13 is a reading device that reads an image from a document. The printer 14 is a print device that performs printing on a recording medium such as a paper sheet. The fax communication unit 15 is a fax device that performs fax communications with an external facsimile device (not illustrated) via a communication line such as a dial-up line. The network communication unit 16 is a network communication device that communicates with an external device via a network such as a Local Area Network (LAN) and the Internet. The storage unit 17 is a storage device such as an Electrically Erasable Programmable Read Only Memory (EEPROM) and a Hard Disk Drive (HDD). The control unit 18 controls the entire MFP 10.

The storage unit 17 stores a halftone dot addition program 17a executed by the control unit 18. The halftone dot addition program 17a may be installed to the MFP 10 at a production stage of the MFP 10, may be additionally installed from a storage medium such as an SD card and a Universal Serial Bus (USB) memory to the MFP 10, or may be additionally installed from a network to the MFP 10.

The control unit 18 includes, for example, a central processing unit (CPU), a read only memory (ROM) that stores a program and various data, and a random access memory (RAM) that is used for a work area of the CPU. The CPU executes a program stored in the ROM or the storage unit 17.

When the control unit 18 executes the halftone dot addition program 17a stored in the storage unit 17, the control unit 18 functions as an empty circle information acquiring unit 18a and a halftone dot addition unit 18b. The empty circle information acquiring unit 18a obtains a radius of an empty circle, which will be described later, in the Voronoi diagram. The halftone dot addition unit 18b adds a halftone dot to a halftone dot image.

The Voronoi diagram is a diagram in which the closet space from respective generatrixes present in a space is divided with a hyperplane such as a line and a surface. That is, the Voronoi diagram can be defined as a collection of Voronoi regions $\{V(p_1), V(p_2), \ldots, V(p_n)\}$ with respect to a finite set $P=\{p_1, p_2, \ldots, p_n\}$ in a metric space. Here, the Voronoi region means a region $V(p_i)$ constituted of the following Formula 1 with respect to a distance function d. In the formula shown in Formula 1, $d(p, p_i)$ is a distance between a point p and a point $p_i$ while $d(p, p_j)$ is a distance between the point p and a point $p_j$.

$$V(p_i)=\{p|d(p,p_i) \leq d(p,p_j), i \neq j\} \quad \text{[Formula 1]}$$

The empty circle means a circle that does not include a generatrix inside of the empty circle. Here, the Voronoi diagram has a property that a Voronoi vertex is present at a position at the same distance from the plurality of generatrixes close to one another. Accordingly, centering the Voronoi vertex, the empty circle passing through the plurality of generatrixes is present.

Figure 2:
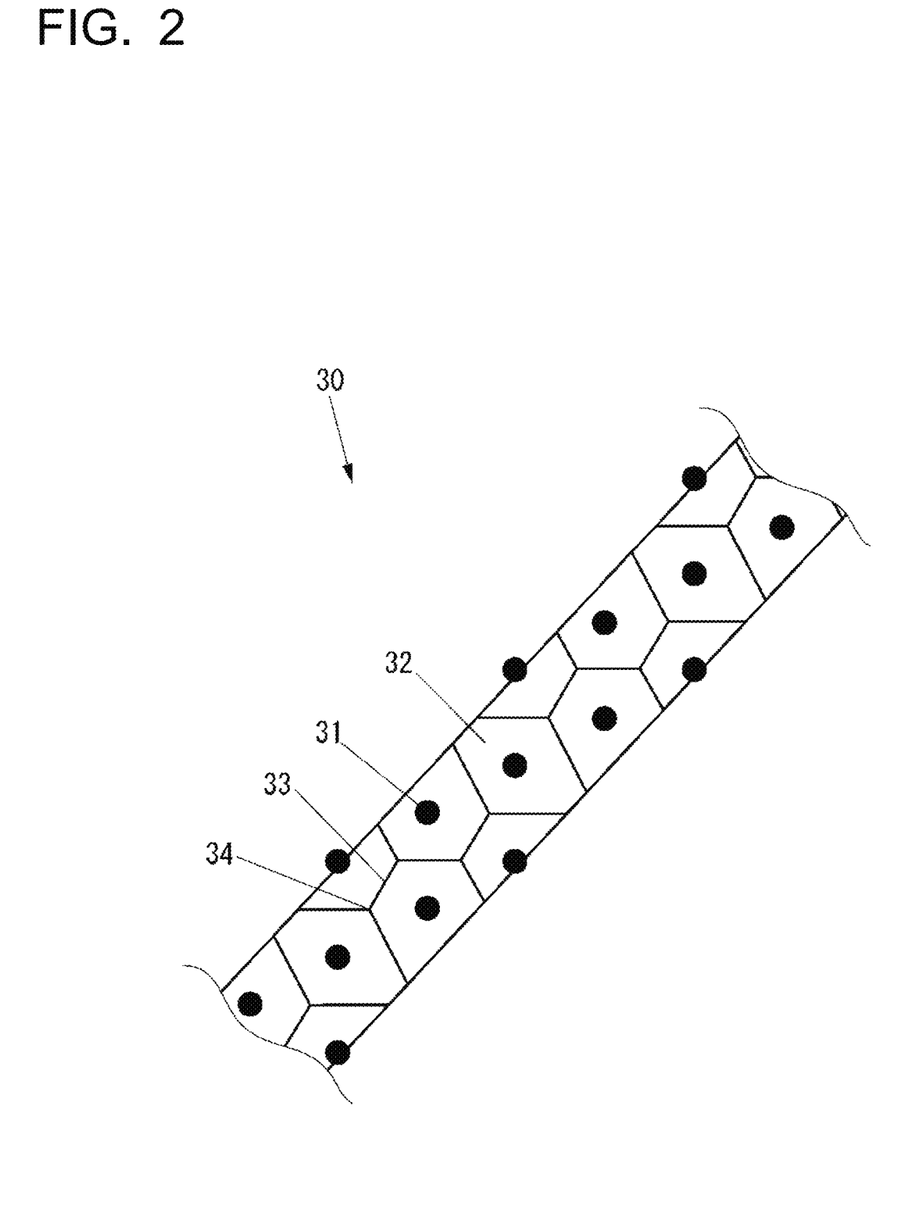
FIG. 2 illustrates an exemplary Voronoi diagram generated by the MFP according to the embodiment.

FIG. 2 illustrates an exemplary Voronoi diagram 30 generated by the MFP 10.

As illustrated in FIG. 2, in the Voronoi diagram 30, the center of the halftone dot in the halftone dot image is a generatrix 31. Voronoi regions 32 that include the respective generatrixes 31 are divided by Voronoi edges 33. An intersection point between the Voronoi edges 33 are referred to as a Voronoi vertex 34.

The following describes operations by the MFP 10.

Figure 3:
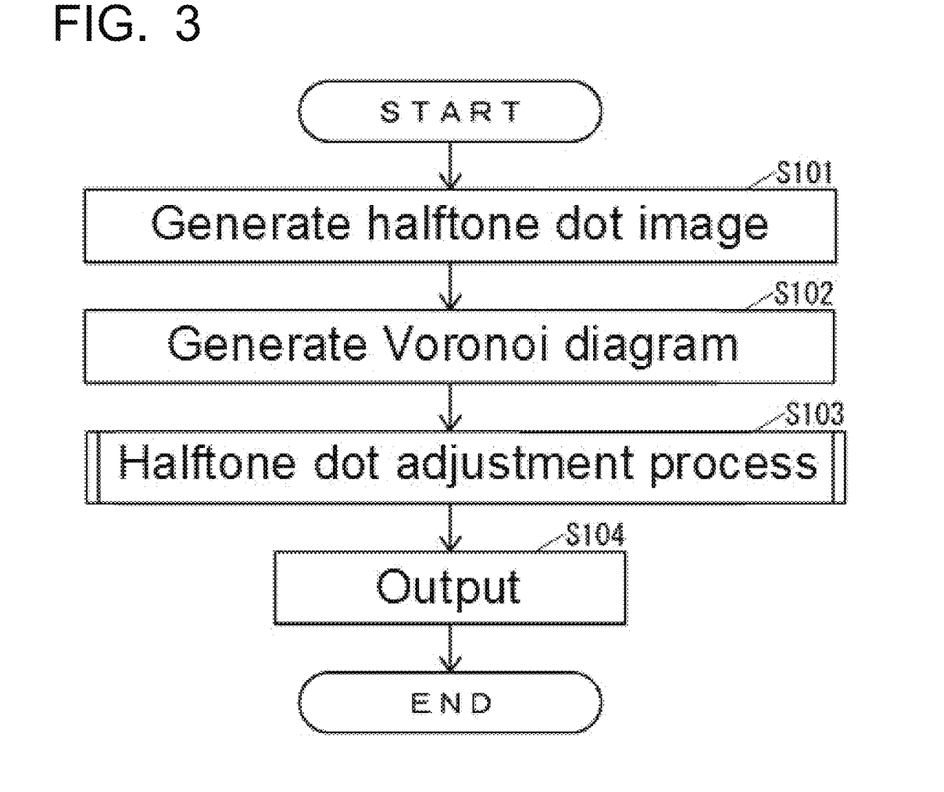
FIG. 3 illustrates an operation of the MFP according to the embodiment when an image is output based on image data.

When an output of an image based on image data is instructed, the control unit 18 of the MFP 10 executes the halftone dot addition program 17a and operates as illustrated in FIG. 3. The image data can be input by, for example, the following methods. The scanner 13 reads an image from a document. The fax communication unit 15 receives the image from a FAX. The network communication unit 16 receives print data.

FIG. 3 illustrates an operation of by the MFP 10 when an image is output based on image data.

As illustrated in FIG. 3, the control unit 18 generates the halftone dot image from the image data by screening (S101).

Figure 4A:
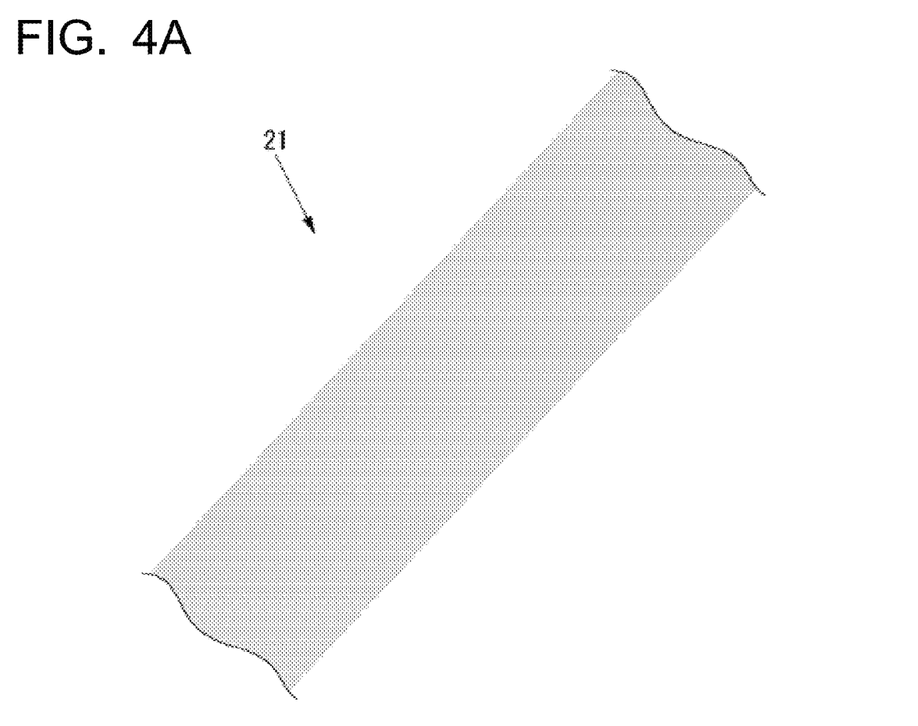
FIG. 4A illustrates an exemplary image based on image data handled by a control unit according to the embodiment.
Figure 4B:
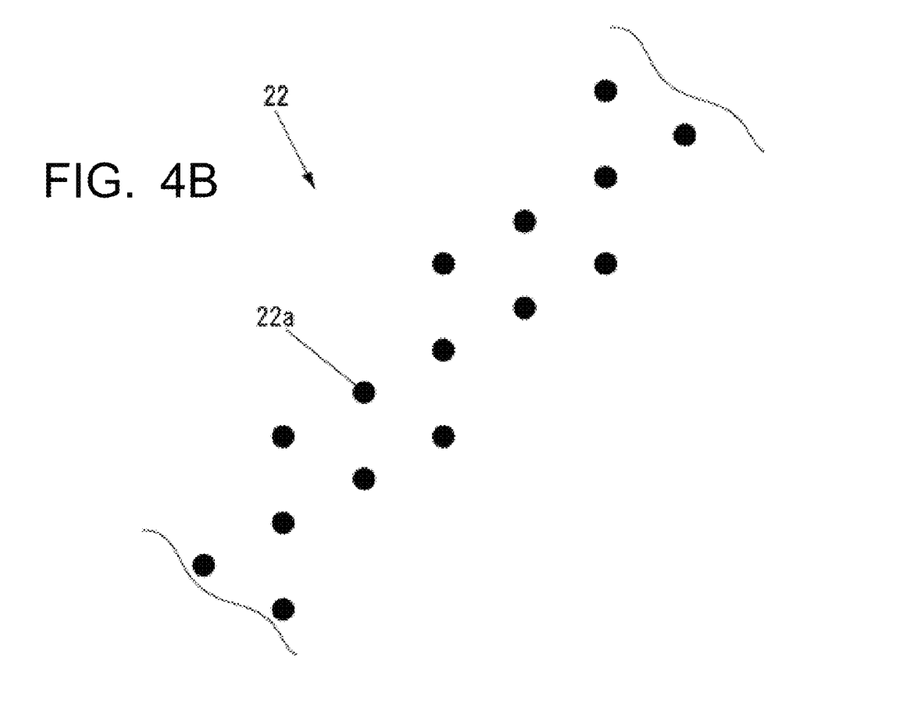
FIG. 4B illustrates an exemplary halftone dot image generated from the image.

FIG. 4A illustrates an exemplary image 21 based on image data handled by the control unit 18. FIG. 4B illustrates an exemplary halftone dot image 22 generated from the image 21 illustrated in FIG. 4A.

At S101, the control unit 18 transforms, for example, the image 21, which is illustrated in FIG. 4A, into the halftone dot image 22, which is illustrated in FIG. 4B, by screening. The halftone dot image 22 is an image constituted of halftone dots 22a.

As illustrated in FIG. 3, when the process of S101 is terminated, the control unit 18 generates the Voronoi diagram 30 (S102). The Voronoi diagram 30 includes the generatrix 31. The generatrix 31 is the center of the halftone dot 22a in the halftone dot image 22, which is generated at S101.

At S102, the control unit 18 generates, for example, the Voronoi diagram 30 illustrated in FIG. 2.

Figure 5:
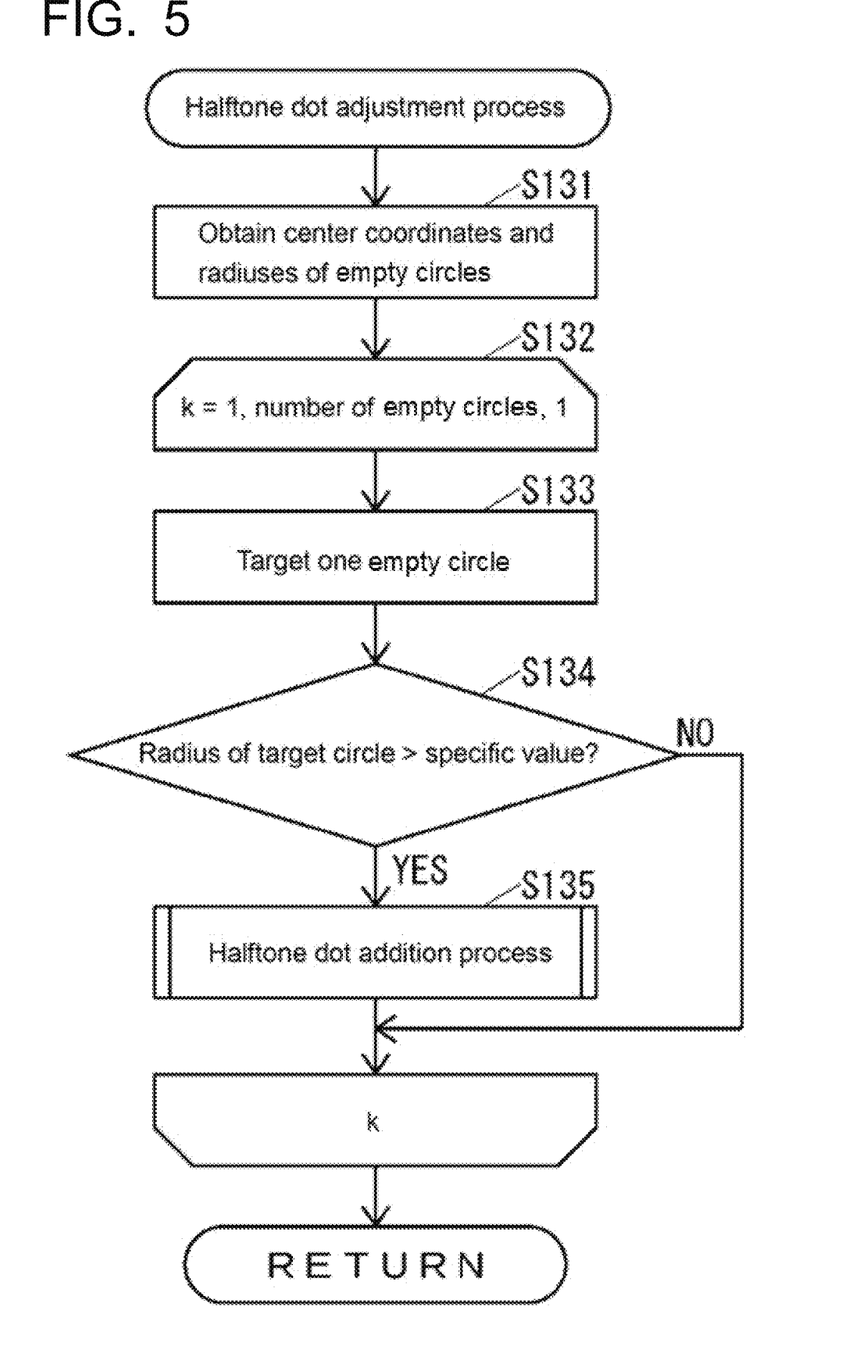
FIG. 5 illustrates of the halftone dot adjustment process according to the embodiment.

As illustrated in FIG. 3, when the process of S102 is terminated, the control unit 18 performs the halftone dot adjustment process illustrated in FIG. 5 (S103). The halftone dot adjustment process adjusts the number of halftone dots 22a in the halftone dot image 22, which is generated at S101.

FIG. 5 is a flowchart of the halftone dot adjustment process illustrated in FIG. 3.

Figure 6:
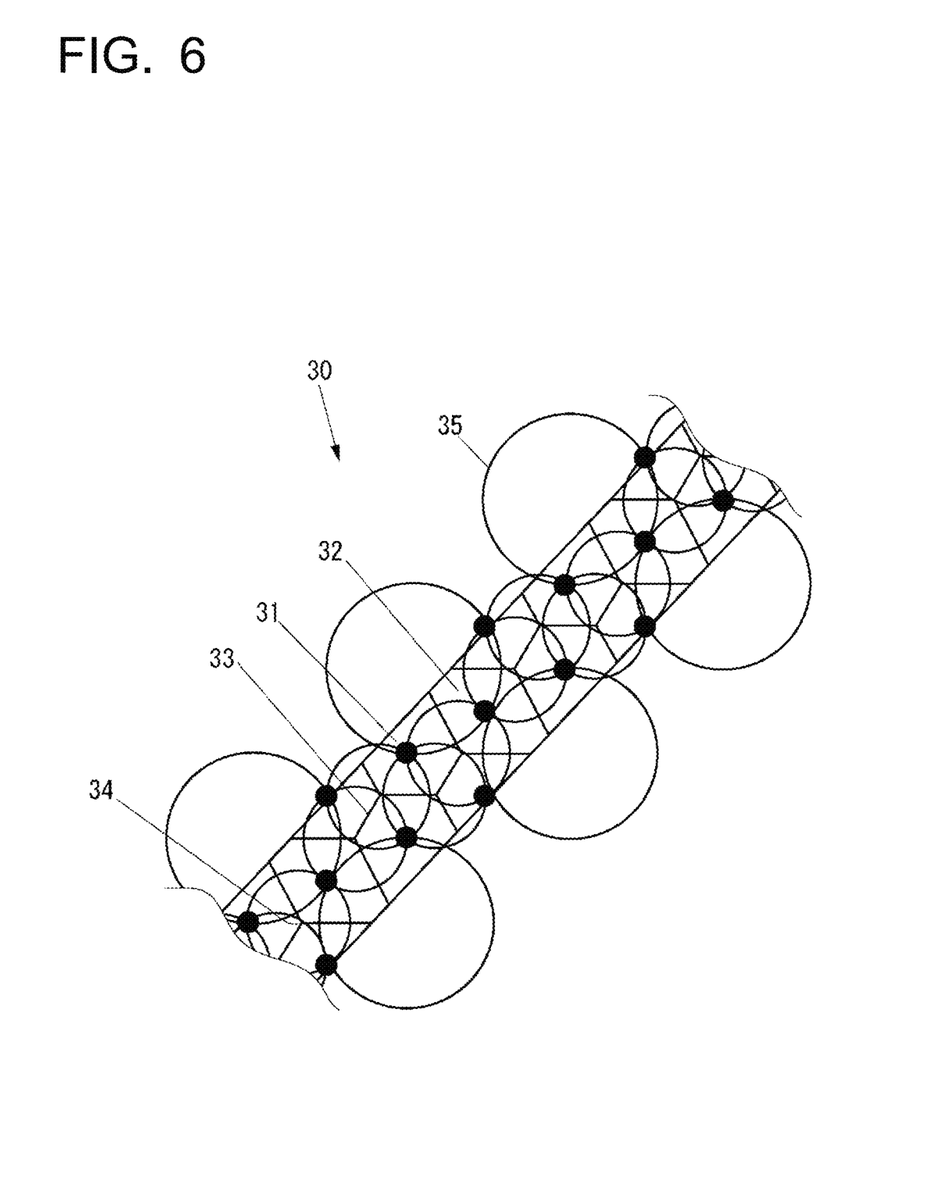
FIG. 6 illustrates an exemplary empty circle handled in the halftone dot adjustment process according to the embodiment.

As illustrated in FIG. 5, the empty circle information acquiring unit 18a of the control unit 18 obtains center coordinates and radiuses of respective empty circles 35 (see FIG. 6) (S131). The empty circle 35 is a circle that does not internally include the generatrix 31 and passes through the three generatrixes 31 centering the Voronoi vertex 34 in the Voronoi diagram 30, which is generated at S102. Here, the empty circle information acquiring unit 18a sets the coordinate of the Voronoi vertices 34 that is the center of the empty circles 35, as a coordinate of the center of the empty circles 35. The empty circle information acquiring unit 18a sets a distance between the generatrix 31 through which the empty circle 35 passes and the Voronoi vertex 34, which is the center of the empty circle 35, as the radius of the empty circle 35.

As illustrated in FIG. 5, when the process of S131 is terminated, the halftone dot addition unit 18b of the control unit 18 sets a variable k to "1" that is the initial value. Then, the halftone dot addition unit 18b repeats execution of the processes of S133 to S135 and addition of "1" that is the subsequent incremental value to the variable k, until the variable k exceeds "the number of empty circles," which is the final value (S132). Here, "the number of empty circles" is the total number of the empty circles 35 present in the Voronoi diagram 30, which is generated at S102.

The halftone dot addition unit 18b targets the one empty circle 35 that has not yet been targeted among the empty circles 35 present in the Voronoi diagram 30, which is generated at S102 (S133). Then, the halftone dot addition unit 18b determines whether or not the radius obtained at S131 of the target empty circle 35 (hereinafter referred to as a "target circle Q") is larger than a specific value set in advance (S134).

Figure 7:
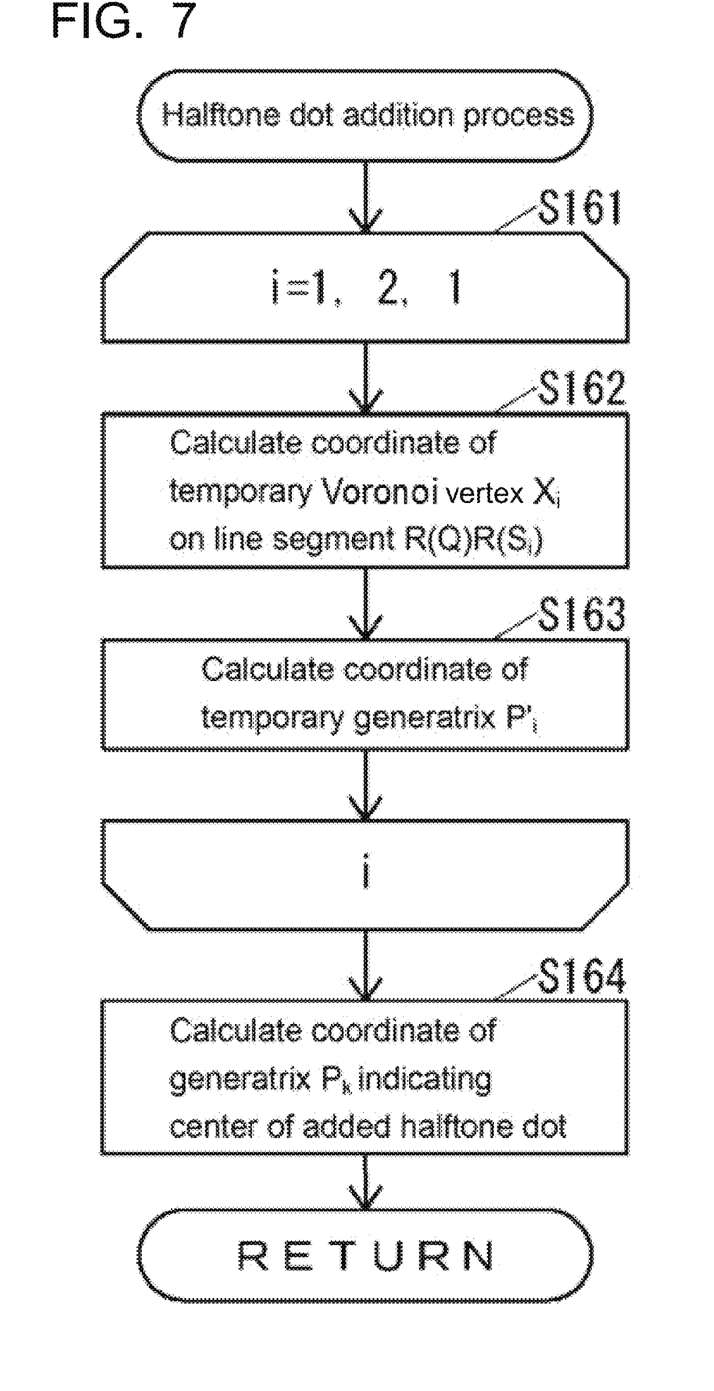
FIG. 7 illustrates the halftone dot addition process according to the embodiment.

When it is determined that the value is larger than the specific value at S134, the halftone dot addition unit 18b performs the halftone dot addition process illustrated in FIG. 7 (S135). The halftone dot addition process adds the halftone dot 22a to the halftone dot image 22.

FIG. 7 is a flowchart of the halftone dot addition process illustrated in FIG. 5.

As illustrated in FIG. 7, the halftone dot addition unit 18b sets a variable i to "1" that is the initial value. Then, the halftone dot addition unit 18b repeats execution of the processes of S162 and S163 and addition of "1," which is the subsequent incremental value to the variable i, until the variable i exceeds "2," which is the final value (S161).

Figure 8:
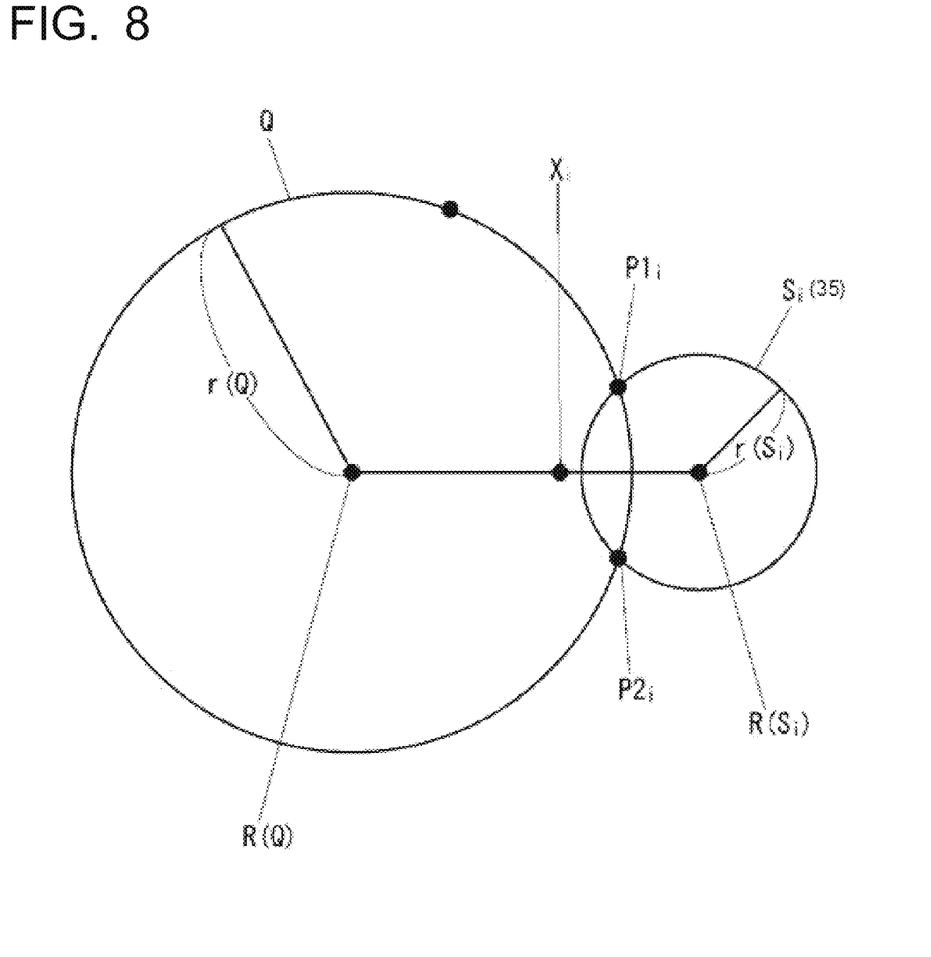
FIG. 8 illustrates an exemplary temporary Voronoi vertex handled in the halftone dot addition process according to the embodiment.

FIG. 8 illustrates a temporary Voronoi vertex $X_i$ handled in the halftone dot addition process illustrated in FIG. 7.

FIG. 8 illustrates the target circle Q and the empty circle 35 (hereinafter referred to as an "adjacent circle $S_i$"). Regarding the generatrix 31 where the target circle Q passes through, the empty circle 35 passes through only the two generatrixes 31. Here, at least the two adjacent circles $S_i$ are present for the one target circle Q. The one of the adjacent circles is referred to as an adjacent circle $S_1$ and the other one is referred to as an adjacent circle $S_2$. Among the generatrixes 31 on the adjacent circle $S_i$, any one of the two generatrixes that are also the generatrixes 31 on the target circle Q is referred to as a generatrix $P1_i$ and the other one is referred to as a generatrix $P2_i$. A temporary Voronoi vertex $X_i$ is a point on a line segment $R(Q)R(S_i)$ and is a temporary Voronoi vertex. The line segment $R(Q)R(S_i)$ connects a point $R(Q)$, which indicates the center of the target circle Q, and the point $R(S_i)$, which indicates the center of the adjacent circle $S_i$.

As illustrated in FIG. 7, the halftone dot addition unit 18b calculates the coordinate of the temporary Voronoi vertex $X_i$ according to a specific rule (S162). Here, various rules can be employed as a specific rule. For example, the halftone dot addition unit 18b may calculate the coordinate of the temporary Voronoi vertex $X_i$ as the formula expressed by the following Formula 2. In Formula 2, a ratio of a length of the line segment $R(Q)X_i$ which connects the point $R(Q)$ and the temporary Voronoi vertex $X_i$, and the length of the line segment $X_iR(S_i)$, which connects the temporary Voronoi vertex $X_i$ and the point $R(S_i)$, becomes $r(Q)^{1/2}:r(S_i)^{1/2}$ based on the radius $r(Q)$ of the target circle Q and the radius $r(S_i)$ of the adjacent circle $S_i$.

$$X_i = \frac{R(Q) \times \sqrt{r(S_i)} + R(S_i) \times \sqrt{r(Q)}}{\sqrt{r(S_i)} \times \sqrt{r(Q)}} \qquad \text{[Formula 2]}$$

In Formula 2, $R(Q)$, and $R(S_i)$ are coordinates of the temporary Voronoi vertex $X_i$, the point $R(Q)$, and the point $R(S_i)$, respectively.

The halftone dot addition unit 18b may calculate the coordinate of the temporary Voronoi vertex $X_i$, where the ratio of the length of the line segment $R(Q)X_i$ and the length of the line segment $X_iR(S_i)$ becomes $r(Q):r(S_i)$ based on the radius $r(Q)$ of the target circle Q and the radius $r(S_i)$ of the adjacent circle $S_i$. Additionally, the halftone dot addition unit 18b may calculate the coordinate of the temporary Voronoi vertex $X_i$ according to a rule other than the rule based on the radius $r(Q)$ of the target circle Q and the radius $r(S_i)$ of the adjacent circle $S_i$. For example, the halftone dot addition unit 18b may set the middle point of the line segment $R(Q)R(S_i)$ as the temporary Voronoi vertex $X_i$.

Figure 9:
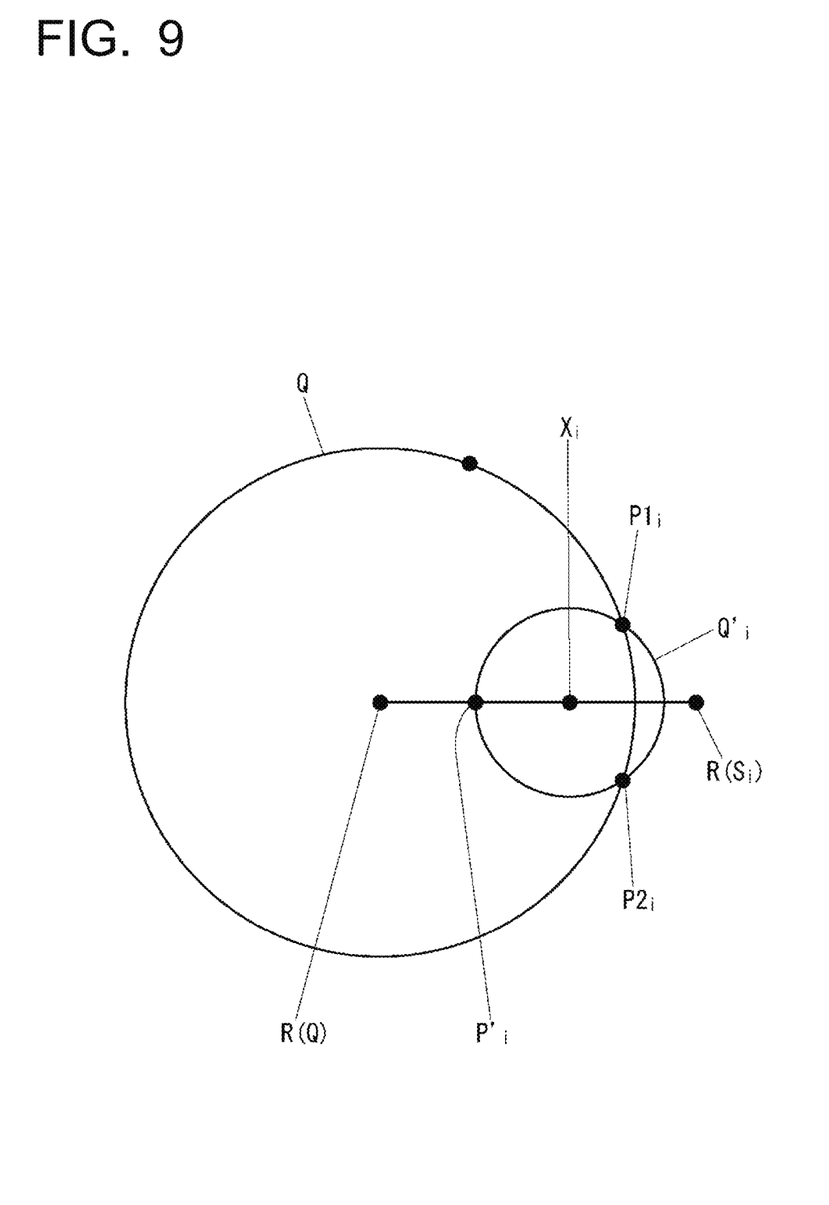
FIG. 9 illustrates an exemplary temporary generatrix handled in the halftone dot addition process according to the embodiment.

FIG. 9 illustrates a temporary generatrix $P'_i$ handled in the halftone dot addition process illustrated in FIG. 7.

In FIG. 9, a temporarily empty circle $Q'_i$ is a temporarily empty circle centering the temporary Voronoi vertex $X_i$ whose coordinate is calculated at S162 and passes through the generatrix $P1_i$ and the generatrix $P2_i$. The temporary generatrix $P'_i$ is a temporary generatrix through which the temporarily empty circle $Q'_i$ passes and an intersection point of the line segment $R(Q)R(S_i)$ and the temporarily empty circle $Q'_i$. When the two intersection points of the line segment $R(Q)R(S_i)$ and the temporarily empty circle $Q'_i$ are present, the point closer to the point $R(Q)$ that indicates the center of the target circle Q is the temporary generatrix $P'_i$.

Here, the temporary generatrix $P'_i$ is a point that internally divides the line segment $R(Q)X_i$. Accordingly, the coordinate of the temporary generatrix $P'_i$ is expressed by a formula expressed by the following Formula 3.

$$P'_i = \frac{R(Q) \times P'_iX_i + X_i \times R(Q)P'_i}{P'_iX_i + R(Q)P'_i} \qquad \text{[Formula 3]}$$

In Formula 3, $P'_i$, $R(Q)$, and $X_i$ are coordinates of the temporary generatrix $P'_i$, the point $R(Q)$, and the temporary Voronoi vertex $X_i$, respectively. $R(Q)P'_i$ is a length of the line segment $R(Q)P'_i$ connecting the point $R(Q)$ and the temporary generatrix $P'_i$. $P'_iX_i$ is a length of the line segment $P'_iX_i$ connecting the temporary generatrix $P'_i$ and the temporary Voronoi vertex $X_i$. Here, the line segment $R(Q)P'_i$ satisfies the relationship expressed by the following Formula 4 between the line segment $R(Q)X_i$, which connects the point $R(Q)$ and the temporary Voronoi vertex $X_i$, and the line segment $P'_iX_i$. Since the line segment $P'_iX_i$ is the radius of the temporarily empty circle $Q'_i$, the relationship expressed by the following Formula 5 is met.

$$R(Q)P'_i = R(Q)X_i - P'_iX_i \qquad \text{[Formula 4]}$$

$$P'_iX_i = P1_iX_i \qquad \text{[Formula 5]}$$

In Formula 4, $R(Q)X_i$ is a length of the line segment $R(Q)X_i$. In Formula 5, $P1_iX_i$ is a length of the line segment $P1_iX_i$ connecting the generatrix $P1_i$ and the temporary Voronoi vertex $X_i$.

Accordingly, as illustrated in FIG. 7, when the process of S162 is terminated, the halftone dot addition unit 18b calculates the coordinate of the temporary generatrix $P'_i$ by the formula expressed by the following Formula 6 (S163).

$$P'_i = \frac{R(Q) \times P1_iX_i + X_i \times (R(Q)X_i - P1_iX_i)}{R(Q)X_i} \qquad \text{[Formula 6]}$$

Figure 10:
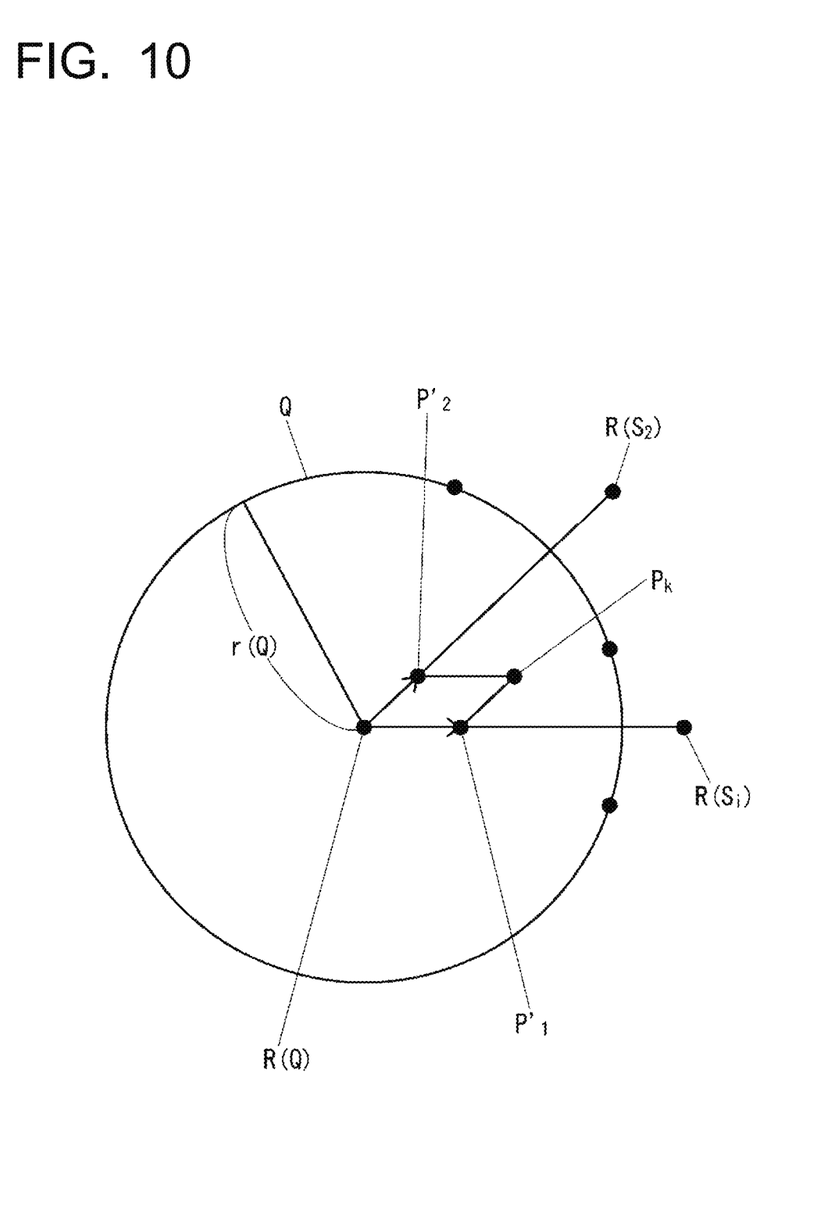
FIG. 10 is an exemplary generatrix indicative of the center of an added halftone dot handled in the halftone dot addition process according to the embodiment.

FIG. 10 illustrates a generatrix $P_k$ indicative of the center of an added halftone dot handled in the halftone dot addition process illustrated in FIG. 7.

In FIG. 10, the coordinate of the generatrix $P_k$ indicative of the center of the added halftone dot is expressed by the formula shown in the following Formula 7. Formula 7 uses the coordinate of the point $R(Q)$ indicative of the center of the target circle Q, $\text{vec}(R(Q),P'_1)$, which indicates a vector setting the point $R(Q)$ as the starting point and the temporary generatrix $P'_1$ as the ending point, and $\text{vec}(R(Q),P'_2)$, which indicates a vector setting the point $R(Q)$ as the starting point and the temporary generatrix $P'_2$ as the ending point.

$$P_k = R(Q) + \text{vec}(R(Q),P'_1) + \text{vec}(R(Q),P'_2) \qquad \text{[Formula 7]}$$

In Formula 7, $P_k$ is the coordinate of the generatrix $P_k$.

As illustrated in FIG. 7, when the repeat process of S161 is terminated, the halftone dot addition unit 18b calculates the coordinate of the generatrix $P_k$ indicating the center of the added halftone dot by the formula expressed by Formula 7 (S164).

When the process of S164 is terminated, the halftone dot addition unit 18b terminates the halftone dot addition process illustrated in FIG. 7.

As illustrated in FIG. 5, when it is determined that the value is not larger than the specific value at S134, the halftone dot addition unit 18b does not perform the halftone dot addition process at S135.

When the repeat process of S132 is terminated, the halftone dot addition unit 18b terminates the halftone dot adjustment process illustrated in FIG. 5.

Figure 11:
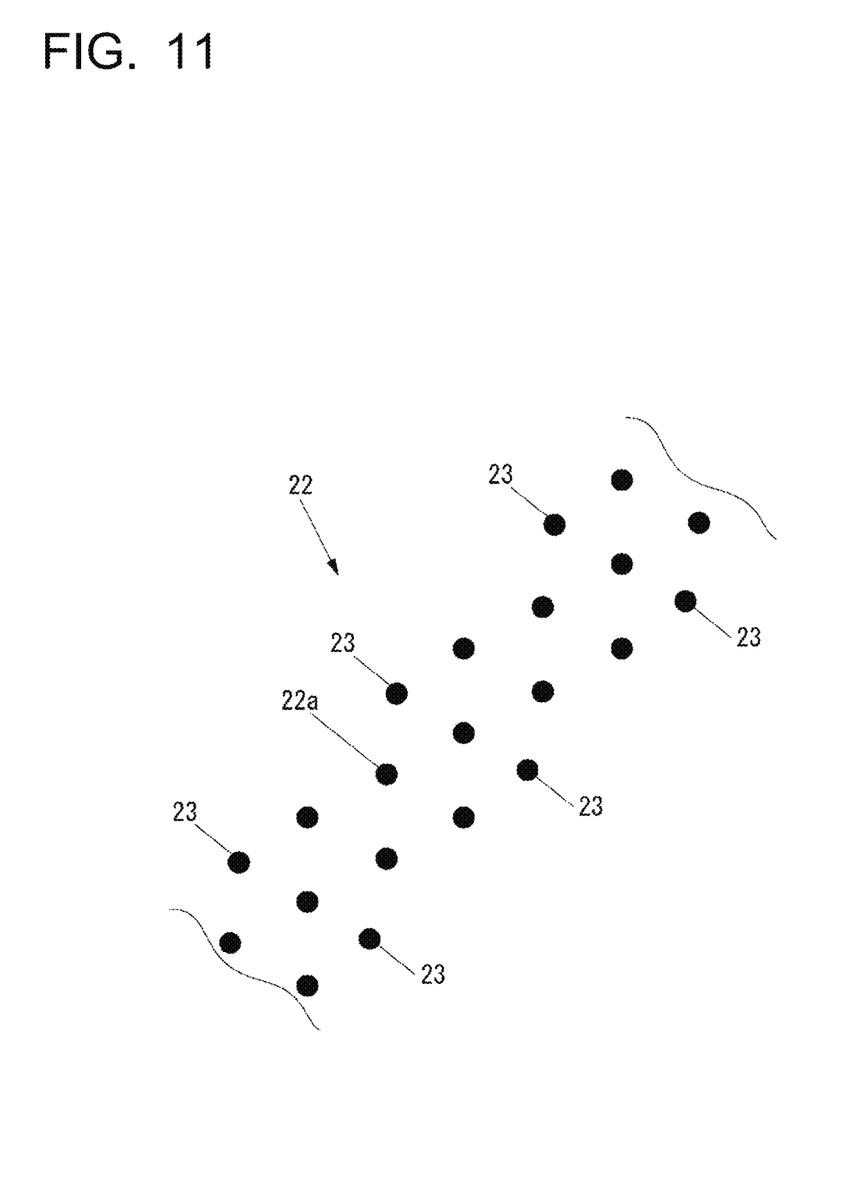
FIG. 11 illustrates a state where the halftone dots are added to the halftone dot image according to the embodiment.

Accordingly, for example, as illustrated in FIG. 11 the halftone dots 22a are added to the halftone dot image 22 illustrated in FIG. 4B by the amount of halftone dots 23 centering the generatrix $P_k$ whose coordinate is calculated at S164. The size of the added halftone dot 22a is the same as the size of the other halftone dots 22a.

As illustrated in FIG. 3, when the halftone dot adjustment process of S103 is terminated, the control unit 18 outputs the halftone dot image 22 whose number of halftone dots 22a are adjusted by the halftone dot adjustment process at S103 (S104), and then terminates the operations illustrated in FIG. 3.

A method for outputting an image includes, for example, printing using the printer 14.

As described above, when the radius of the target circle Q in the Voronoi diagram 30 is larger than the specific value (YES at S134), the MFP 10 adds the new generatrix 31 to the inside of the target circle Q. The MFP 10 adds the halftone dot 22a corresponding to the new generatrix 31 to the halftone dot image 22 (S164). This ensures reducing a white void and a break at the part of the edge of the image even if information stored in advance is little.

The MFP 10 determines the position of the new generatrix 31 based on the position of the center of the target circle Q and the position of the center of the adjacent circle $S_i$ (S161 to S164). This ensures adding the new halftone dot 22a at an appropriate position corresponding to the position of the nearby halftone dots 22a.

The MFP 10 determines the position of the new generatrix 31 based on the position of the center of the target circle Q and the position of the center of the two adjacent circles $S_i$ (S161 to S164). This ensures adding the new halftone dot 22a at a further appropriate position corresponding to the position of the nearby halftone dots 22a.

The MFP 10 determines not only the position of the center of the target circle Q and the position of the center of the adjacent circles $S_i$ but also determines the position of the new generatrix 31 based on the radius of the target circle Q and the radius of the adjacent circle $S_i$ (S161 to S164). Accordingly, the new halftone dot 22a can be added to a further appropriate position according to the position of the nearby halftone dots 22a.

This embodiment arranges the generatrix 31 of the Voronoi diagram 30 at the center of the halftone dot 22a in the halftone dot image 22. However, insofar as the generatrix 31 is at a position corresponding to the halftone dot 22a, the generatrix 31 may be arranged at a position other than the center of the halftone dot 22a.

The halftone dot addition apparatus of the disclosure is the MFP in this embodiment. However, the halftone dot addition apparatus may be an image forming apparatus other than the MFP such as a copying machine and a printer, and also may be a computer other than the image forming apparatus such as a general-purpose personal computer.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A halftone dot addition device for adding halftone dots to halftone dot images, the halftone dot addition device comprising:
an empty circle information acquiring unit that obtains, in a Voronoi diagram having a generatrix corresponding to a halftone dot in a halftone dot image, the radius of an empty circle being a circle centering on a Voronoi vertex, and the empty circle passing through the generatrix but not internally including the generatrix; and
a halftone dot addition unit that, if the radius of a target circle being the empty circle obtained, as a target, by the empty circle information acquiring unit is larger than a specific value, adds to the halftone dot image a halftone dot corresponding to a new generatrix, by adding the new generatrix to the inside of the target circle.

2. The halftone dot addition apparatus according to claim 1, wherein the halftone dot addition unit determines a position for the new generatrix, based on the position of the center of the target circle and the position of the center of an adjacent circle being the empty circle that, in terms of the generatrices through which the target circle passes, passes through just two generatrices.

3. The halftone dot addition apparatus according to claim 2, wherein the halftone dot addition unit determines the position for the new generatrix based on the position of the center of the target circle and the positions of the centers of two of the adjacent circles.

4. The halftone dot addition apparatus according to claim 2, wherein the halftone dot addition unit determines the position of the new generatrix further based on the radius of the target circle and the radius of the adjacent circle.

5. A non-transitory computer-readable recording medium storing a halftone dot addition program for adding halftone dots to halftone dot images, the halftone dot addition program causing a computer to function as:
an empty circle information acquiring unit that obtains, in a Voronoi diagram having a generatrix corresponding to a halftone dot in a halftone dot image, the radius of an empty circle being a circle centering on a Voronoi vertex, and the empty circle passing through the generatrix but not internally including the generatrix; and
a halftone dot addition unit that, if the radius of a target circle being the empty circle obtained, as a target, by the empty circle information acquiring unit is larger than a specific value, add to the halftone dot image a halftone dot corresponding to a new generatrix, by adding the new generatrix to the inside of the target circle.

6. A method for adjusting halftone dot images utilizing a halftone-dot addition device including an empty-circle information acquiring unit and a halftone-dot addition unit, the halftone-dot image adjusting method comprising:
receiving input data constituting an input halftone-dot image;
obtaining, via the empty-circle information acquiring unit, in a Voronoi diagram having generatrices corresponding to halftone dots in the input halftone dot image, the radii of empty circles being circles centering on Voronoi vertices, and the empty circles passing through the generatrices but not internally including the generatrices;
if the radii of target circles being the empty circles obtained, as targets, by the obtaining is larger than a specific value, generating an adjusted halftone-dot image from the input halftone-dot image by adding, via the halftone-dot addition unit, to the input halftone-dot image halftone dots corresponding to new generatrices, by adding the new generatrices to the inside of the target circles; and
outputting the adjusted halftone dot image.

* * * * *